US011316740B1

(12) United States Patent
Vardharajan

(10) Patent No.: US 11,316,740 B1
(45) Date of Patent: Apr. 26, 2022

(54) SYSTEM AND METHOD FOR AUTONOMOUS CAPACITY CLUSTER AUGMENT

(71) Applicant: AT&T Intellectual Property I, L.P., Atlanta, GA (US)

(72) Inventor: Satya B. Vardharajan, San Diego, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 17/070,699

(22) Filed: Oct. 14, 2020

(51) Int. Cl.
| *H04L 12/24* | (2006.01) |
| *H04L 41/0893* | (2022.01) |
| *H04L 41/08* | (2022.01) |
| *H04L 41/14* | (2022.01) |
| *H04L 41/5009* | (2022.01) |

(52) U.S. Cl.
CPC ...... *H04L 41/0893* (2013.01); *H04L 41/0886* (2013.01); *H04L 41/14* (2013.01); *H04L 41/5009* (2013.01)

(58) Field of Classification Search
CPC . H04L 41/0886; H04L 41/0893; H04L 41/14; H04L 41/5009
See application file for complete search history.

(56) References Cited

U.S. PATENT DOCUMENTS

| 9,961,675 | B1 * | 5/2018 | Reed | H04W 72/0406 |
| 10,514,690 | B1 * | 12/2019 | Siegel | G01C 23/00 |
| 2015/0236779 | A1 * | 8/2015 | Jalali | H04W 16/28 342/367 |
| 2018/0300834 | A1 * | 10/2018 | High | G05D 1/0088 |

\* cited by examiner

*Primary Examiner* — Gil H. Lee
(74) *Attorney, Agent, or Firm* — Guntin & Gust, PLC; Matthew Tropper

(57) ABSTRACT

A fully autonomous method includes defining a first key performance indicator for a network, monitoring the network based on the first key performance indicator, determining whether a physical capacity augment of the network is recommended based on established platform capacity engineering rules and regular network capacity usage monitoring, configuring a mobile physical capacity augment unit based on the determining step, and autonomously deploying the mobile physical capacity augment unit to implement a physical augment.

20 Claims, 7 Drawing Sheets

SYSTEM AND METHOD FOR AUTONOMOUS CAPACITY CLUSTER AUGMENT

TECHNICAL FIELD

This disclosure is directed to a system and method for autonomously providing physical infrastructure augments to networks.

BACKGROUND

Information technology and network service providers build robust infrastructure and networks with a goal of providing excellent quality of service to their customers. As customers use the services, they consume infrastructure capacity. This rate of consumption must be carefully managed to prevent adverse effects on the quality of service.

Engineering rules or guidelines typically specify capacity thresholds of the infrastructure or networks, called exhaust, that must be prevented as it could lead to a degradation of performance, and therefore a reduction in quality of service. To avoid exhaust, augments are provided to keep capacity levels above exhaust. These augments may be in the form of logical augments or physical augments.

Physical augment of infrastructure or network capacity is a manual step-by-step procedure today where a capacity planner studies capacity consumption, consumption rates, consumption trends, and augment cycle times, among other parameters. Those planners then develop plans to insert new capacity to prevent exhaust at each location of concern. This procedure involves many steps including securing funding, procurement of equipment, installation, software loading, confirmation, testing and turn-up at each location needing augment. This could be an arduous and a time-consuming process. There is a need for an autonomous solution that accelerates capacity augments and prevents exhaust.

SUMMARY

The present disclosure is directed to an autonomous method including defining a first key performance indicator for a network, monitoring the network based on the first key performance indicator, determining whether a physical capacity augment of the network is recommended based on the monitoring step, software load step, configuring a mobile physical capacity augment unit based on the determining step, and deploying the mobile physical capacity augment unit to implement a physical augment. The method may further include connecting the mobile physical capacity augment unit to the network and wherein the mobile physical capacity augment unit traverses to a physical location autonomously and wherein the connecting step is performed autonomously at the physical location. In an aspect, the first key performance indicator includes a network capacity measurement and wherein the determining step determines whether loading on the network has surpassed a first threshold, or wherein the determining step determines whether the loading has surpassed a first threshold for a time period.

In an aspect, the monitoring step may further include monitoring the network based on a second key performance indicator and wherein the first key performance indicator indicates loading on the network has reached a pre-exhaust level and the second key performance indicator indicates loading of the network has reached an exhaust level and wherein the deploying step is based on the second key performance indicator. In an aspect, the configuring step comprises loading software applications on the mobile physical capacity augment unit and sizing the augment to be deployed. In an aspect, the mobile physical capacity augment unit is prebuilt, and the configuring step further includes configuring the mobile physical capacity augment unit to enable attachment to the network. The mobile physical capacity augment unit may be a terrestrial unit, a nautical unit or an aerial unit.

The disclosure is also directed to a system including a capacity manager in communication with a network, wherein the capacity manager is configured to analyze performance of the network in view of key performance indicators of the network, a capacity dispatcher in communication with the capacity manager, wherein the capacity dispatcher is designed to provide network parameters to a mobile physical capacity augment unit, and wherein the mobile physical capacity augment unit comprises an input-output interface, a processor coupled to the input-output interface wherein the processor is further coupled to a memory, the memory having stored thereon executable instructions that when executed by the processor cause the processor to effectuate operations including receiving network parameters relating to a physical augment, loading the correct firmware/software/NOS, autonomously configuring the physical augment based on the network parameters, testing and turning up the physical augment infrastructure, self-navigating to a site at which the physical augment can attach to the network, and attaching to the network. The self-navigating step includes terrestrial navigation, nautical navigation or aerial navigation to the site. In an aspect, the mobile physical capacity augment unit includes a software defined network and the configuring step comprises receiving software commands to configure the physical augment. In an aspect, the mobile physical capacity augment hardware unit is prebuilt, and the configuring step further includes loading, sizing and configuring hardware, firmware and software components of the mobile physical capacity augment unit.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Figure 1:
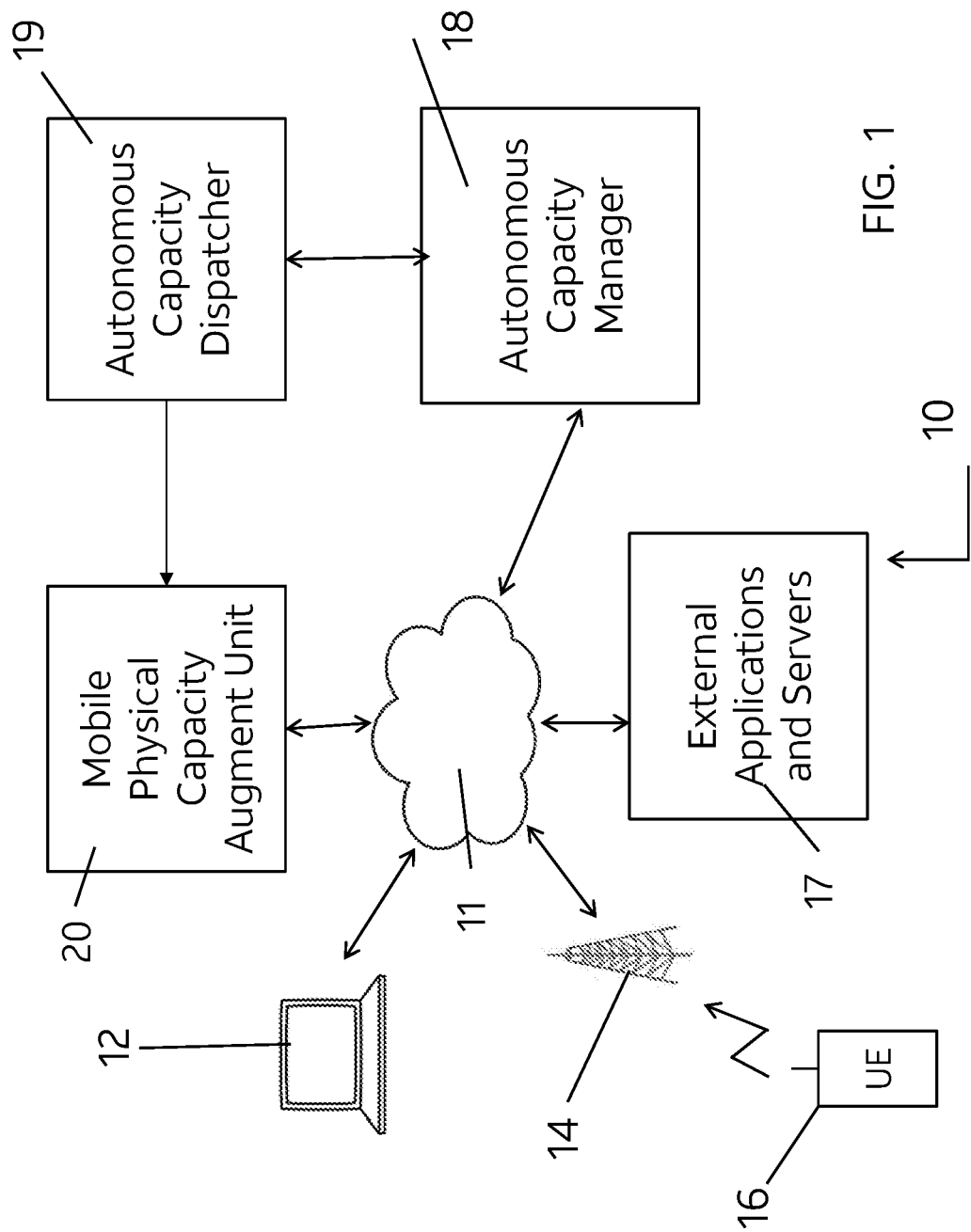
FIG. 1 illustrates an exemplary operating environment of the present disclosure.

System Overview. This disclosure is directed to a novel system and method for a physical augment for infrastructure or network capacity. Logical augments help allocate reserve capacity to production infrastructure so that available capacity could be boosted. Software defined network concepts achieve logical augments using software control. Physical augments add physical infrastructure assets that are needed to boost capacity and prevent exhaust. Some of the physical augment could be kept in reserve for future logical augments.

This disclosure is directed to a novel and useful application and includes a fully autonomous software driven approach to physical capacity augments, and which advance the state of the art to accelerate augments in a network and prevent exhaust.

In an aspect, the end-to-end network service platform capacity can be monitored through software instrumentation and key performance indicators. Physical augments may be provided by a mobile physical capacity augment unit (MP-CAU), which may, for example, be a self-sufficient hardware and software container having resources for power, cooling and wireless connectivity and deployed to a geographic area. The MPCAU may be prepared in advance for an augment load at a desired location before being dispatched to that location. The MPCAU may have embedded autonomous vehicle capability to allow it to navigate to the desired location and attach to the network at that location wirelessly in order to provide needed physical capacity augment.

The disclosure includes the ability to monitor the capacity and utilization of a network from end-to-end by monitoring key performance indicators or other diagnostic instrumentation. Physical capacity augments will use these MPCAUs to prevent capacity exhaust. The MPCAU may be fully automated, including the ability to load, configure, activate and test its hardware and firmware/software.

The pre-built MPCAU may be staged at a desired location prior to deployment. Upon receiving an augment trigger, the MPCAU may perform a self-test and then use its embedded autonomous vehicle capability to navigate to the desired deployment location where it may attach to the network at that deployment location, either wirelessly or through a plug-in interface.

The MPCAU may be a pre-sized and pre-built IT/Telecom infrastructure fully installed in a mobile container conformant with provided service platform design. Service platform designers may designate the size and type of the physical capacity augment units and the functionality associated with each unit. Such MPCAUs may be pre-cabled with the firmware and software loaded, configured and fully installed on the hardware in advance of the augment need. Such containers shall be self-sufficient for their power, cooling and wireless connectivity needs and can be viewed as a mini data center on wheels.

The MPCAU works in tandem with an Autonomous Capacity Manager and Autonomous Capacity Dispatcher as set forth in more detail below.

Operating Environment. The system and method provided herein allows for the automatic physical augment for wireline and wireless networks. While the description will be directed to wireless networks, it will be understood that the concepts described herein may also be applied to information technology infrastructure, including, but not limited to small cell and distributed antenna systems (DAS) wireless networks, cloud augment, content delivery network (CDN) augment, and routing node augments among others.

With reference to FIG. 1, there is shown an exemplary system 10 in accordance with the present disclosure. The system 10 has a network 11. The disclosure is applicable to any type of network 11, including but not limited to any type of wireless communication network, including 3G, fourth generation (4G)/LTE, fifth generation (5G), and any other wireless communication network, a public switched telephone network ("PSTN"), a wide-area local area network ("WLAN"), routed or switched IP, Ethernet or data LAN/WAN networks, and may, for example include virtual private network ("VPN") access points, Wi-Fi access points, and any other access points capable of interfacing with the network 11. It will be understood by those skilled in the art that while the network 11 may comprise the afore-mentioned networks, a combination of one or more communication networks may be used.

Also shown in FIG. 1 are input devices 12 and alternative input devices represented by mobile user equipment 16 such as a smart phone, tablet, PDA or other portable user device in communication via a cellular or other wireless system, represented by cell tower 14, may also be used. Each of the input devices 12, 16 is in communication with the network 11 and any servers attached to the network 11, including any external applications and servers 17.

Autonomous Physical Capacity Augments. The network 11 as shown in FIG. 1 also includes an autonomous capacity manager 18, an autonomous capacity dispatcher 19, and a mobile physical capacity augment unit 20. Together, the autonomous capacity manager 18, the autonomous capacity dispatcher 19 and the mobile physical capacity augment unit 20 work together to provide autonomous physical capacity augments. Each will be described in more detail below and with reference to FIGS. 2, 3, and 4, respectively. While the functionality of the components of the system 10 will be described in relation to the autonomous capacity manager 18, the autonomous capacity dispatcher 19 and the mobile physical capacity augment unit 20, it will be understood that the allocation of functions among each component is exemplary only and one or more of the functions may be combined in one or allocated among multiple servers and/or input devices.

Figure 2:
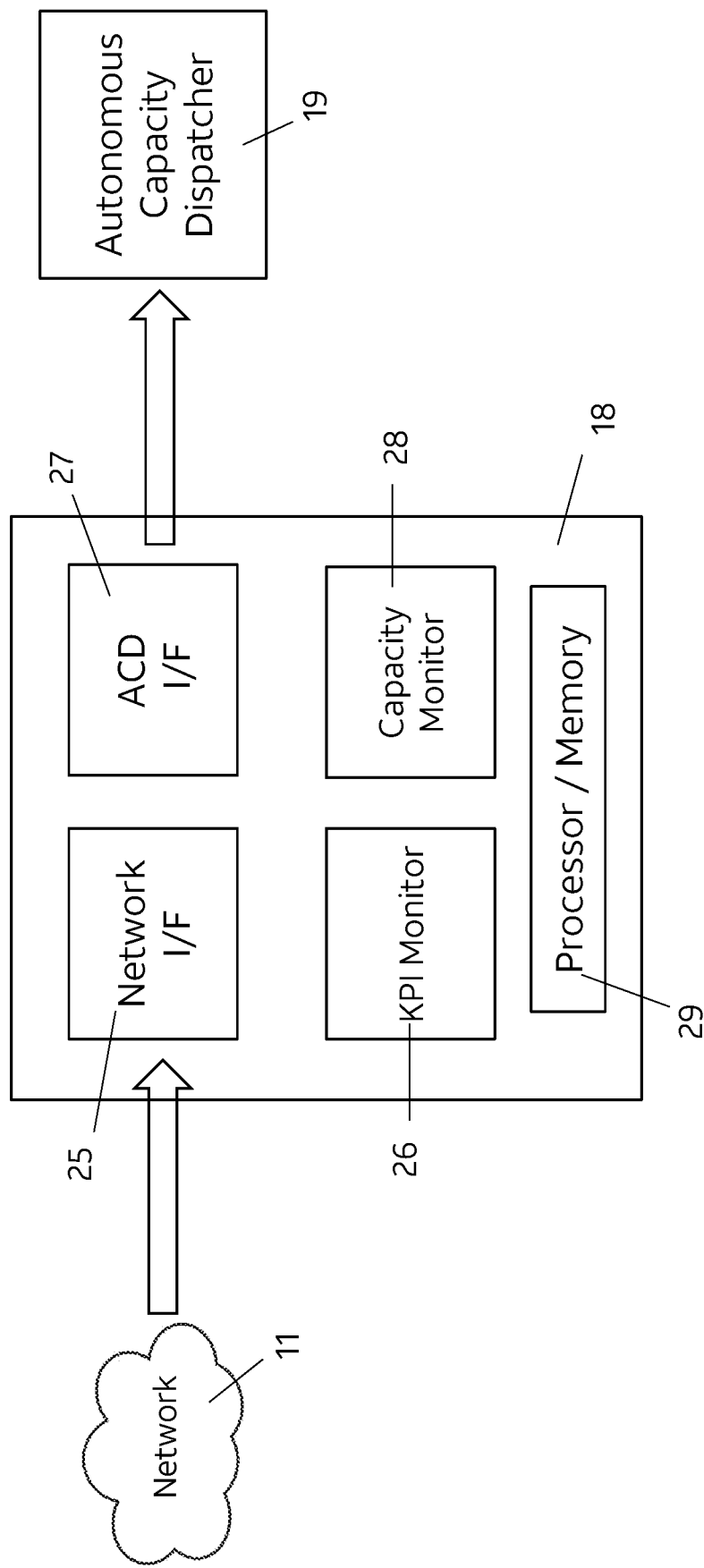
FIG. 2 illustrates an exemplary functional block diagram of an autonomous capacity manager constructed in accordance with the present disclosure.

ACM: Autonomous Capacity Manager. With reference to FIG. 2, there is shown an exemplary functional block diagram of an autonomous capacity manager 18 constructed in accordance with the present disclosure. There is shown a network interface 25 which is in communication with network 11. The network 11 may maintain and send capacity and key performance indicators (KPI) and provide that data to the autonomous capacity manager 18 to be analyzed by the KPI monitor 26 and capacity monitor 28. Other measurements may include quality of service or other network performance metrics. The autonomous capacity manager 18 may include a software system that continuously monitors the capacity utilization of a service platform. Platform designers may supply key performance indicators and key thresholds for capacity utilization to be monitored. The autonomous capacity manager 18 may collect real-time or near-real-time KPI information from network 11 and the KPI monitor 26 may compare the collected KPI information to set thresholds, which may for example, be contained in the capacity engineering rules for the service platform. The autonomous capacity manager 18 may also track network capacity, including locations and usage information, using capacity monitor 28. If a determination is made that one or more key thresholds have been exceeded and a physical capacity augment is desired, the autonomous capacity manager 18, through the autonomous capacity dispatcher interface 27, may trigger the autonomous capacity dispatcher 19 to deploy an augment at a desired location. The autonomous capacity manager 18 may analyze the KPI information, capacity consumption trends and forecast information to discern the size of the physical augment and the location where the physical augment should be located and provide that information to the autonomous capacity dispatcher.

In addition to network metrics, the physical augments may be subject to financial considerations through revised platform capacity engineering rules. For example, a capacity manager may elect to run the network hot, meaning that network may run close to exhaust or in an oversubscribed state for a period of time before triggering deployment.

Figure 3:
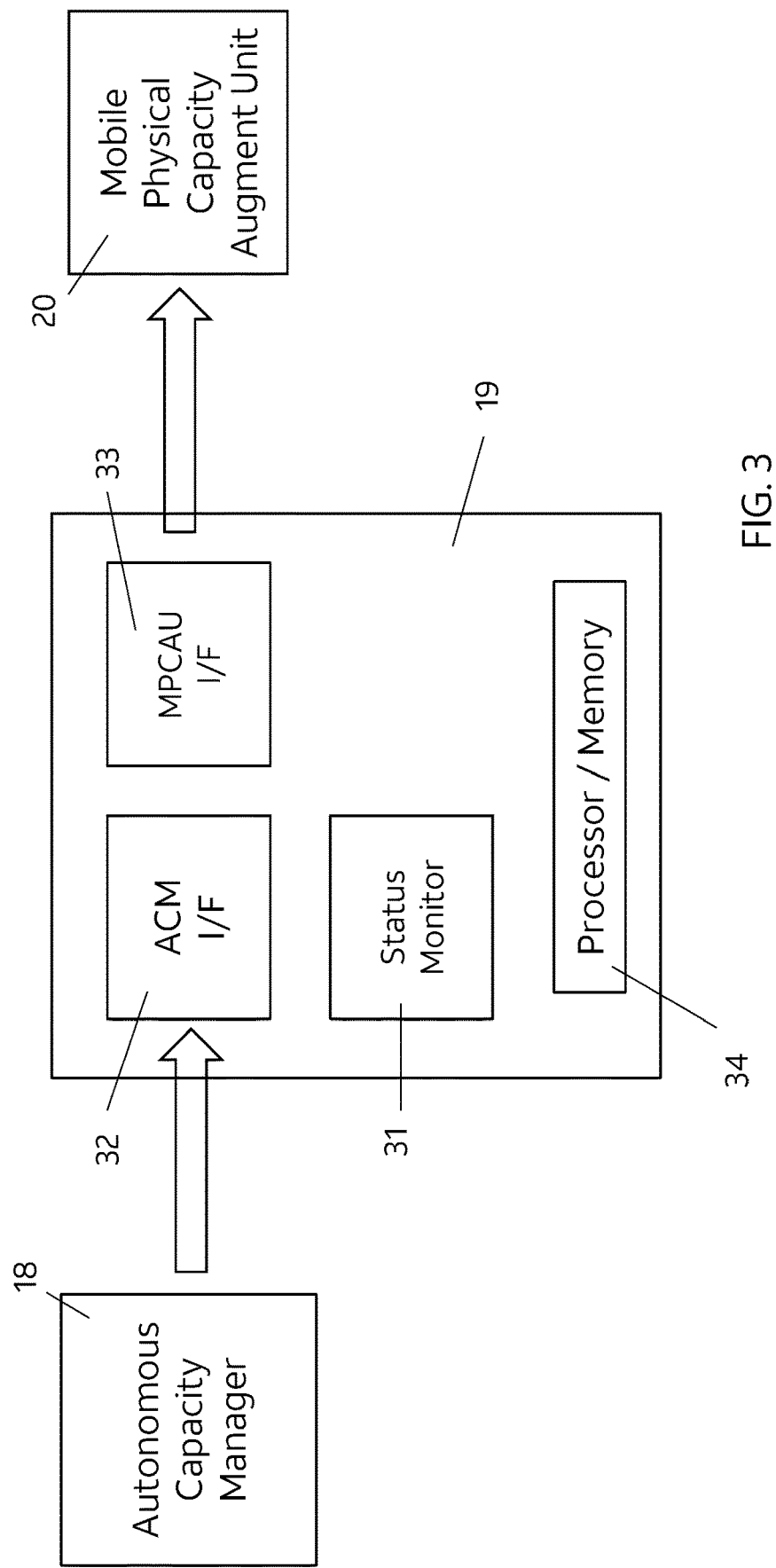
FIG. 3 illustrates an exemplary functional block diagram of an autonomous capacity dispatcher constructed in accordance with the present disclosure.

ACD: Autonomous Capacity Dispatcher. With reference to FIG. 3, there is shown an exemplary functional block diagram of an autonomous capacity dispatcher 19 constructed in accordance with the present disclosure. The autonomous capacity dispatcher 19 may include an autonomous capacity manager interface 32 configured to receive information relating to capacity management actions and augment delivery intervals, the exceeding of KPI thresholds, exhaust parameters which may include, for example the size and type of physical capacity augment needed and the locations of the foregoing. The autonomous capacity dispatcher 19 may also have a mobile physical capacity augment unit interface 33 configured to control the dispatch of one or more mobile physical capacity augment units to a desired location.

The autonomous capacity dispatcher 19 may be centrally located or distributed in or around regional centers. The autonomous capacity dispatcher 19 may execute software applications to implement a physical capacity augment. When capacity levels for infrastructure supporting a service start to approach exhaust levels as determined by the autonomous capacity manager 18, a physical augment may be triggered through the autonomous capacity dispatcher 19. Alternatively, a capacity planner may manually trigger the physical augment. In addition to the trigger conditions, the autonomous capacity dispatcher 19 may also receive other information from the autonomous capacity manager 18, including but not limited to the size and type of the physical augment, the functionality of the physical augment, hardware/firmware/software version, and location information relating to both the source location which may, for example, be a regional depot or a another deployment. of the mobile physical capacity augment unit 20 and where the mobile physical capacity augment unit shall be deployed.

Figure 4:
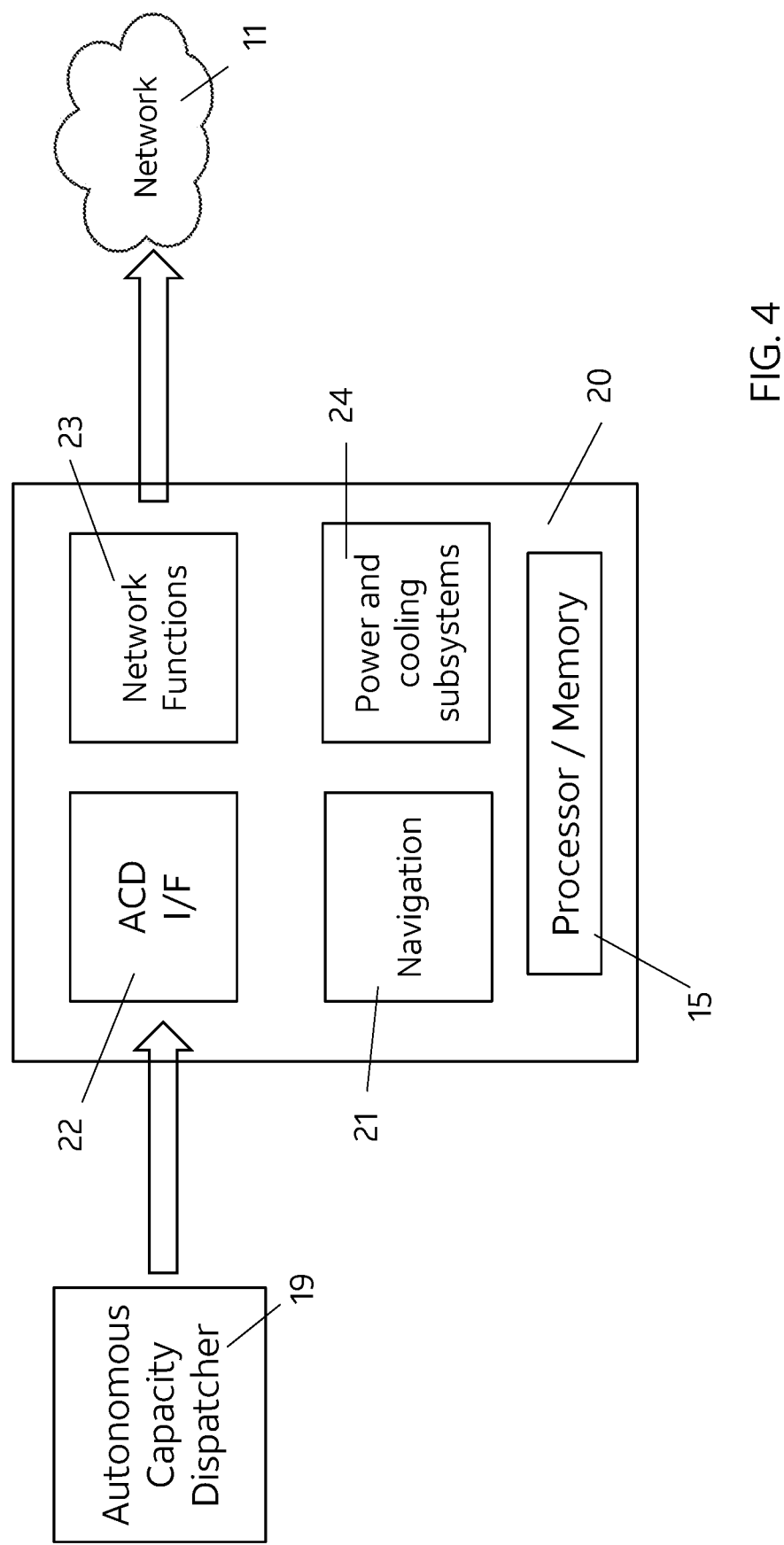
FIG. 4 illustrates an exemplary functional block diagram of a mobile physical capacity augment unit constructed in accordance with the present disclosure.

MPCAU: Mobile Physical Capacity Augment Unit: With reference to FIG. 4, there is shown an exemplary functional block diagram of an MPCAU 20. The MPCAU 20 may function as a mini data center on wheels. Each MPCAU 20 may contain a pre-sized and pre-built IT or telecom network infrastructure fully installed in a mobile container conformant with service platform design. The service platform designers may define the size, type and functionality of each MPCAU 20. In an aspect, the MPCAU 20 hardware may be installed, cabled and turned up ready for physical capacity augment deployment. Overall functionality of the MPCAU 20, including network interfaces, shall be realized through either a purpose-built firmware/software/hardware or as Network Function Virtualization on COTS Firmware/Software/Hardware, loaded and configured in advance of the physical capacity augment needed. Alternatively, firmware/software/OS/NOS may be loaded and configured on demand, or in the case of software-defined networks, virtual network functions may be instantiated on the MPCAU 20 as needed after deployment. Each of the MPCAUs 20 may strive to be self-sufficient by including self-power and cooling 24 capabilities in the physical capacity augment unit and wireless connectivity to attach to network 11.

The MPCAU 20 may include a secure and authenticated autonomous capacity dispatcher interface 22 to which it responds to provide the requested physical augment. In addition, embedded in the MPCAU are autonomous vehicle navigation capabilities 21 that enable the MPCAU 20 to self-navigate to a desired location. Once at the desired location, the MPCAU 20 may attach itself to the network 11 wirelessly or through wireline connections in a secure and authenticated manner and thereafter provide the enhanced physical capacity to provide services.

Also shown in FIG. 2, FIG. 3 and FIG. 4 are processor/memory combinations 29, 34, and 15 respectively. Such processor/memory combinations may be used to store computer instructions to be executed by the processor to perform the functions of the autonomous capacity manager 18, the autonomous capacity dispatcher 19 and the mobile physical capacity augment unit 20.

Figure 5:
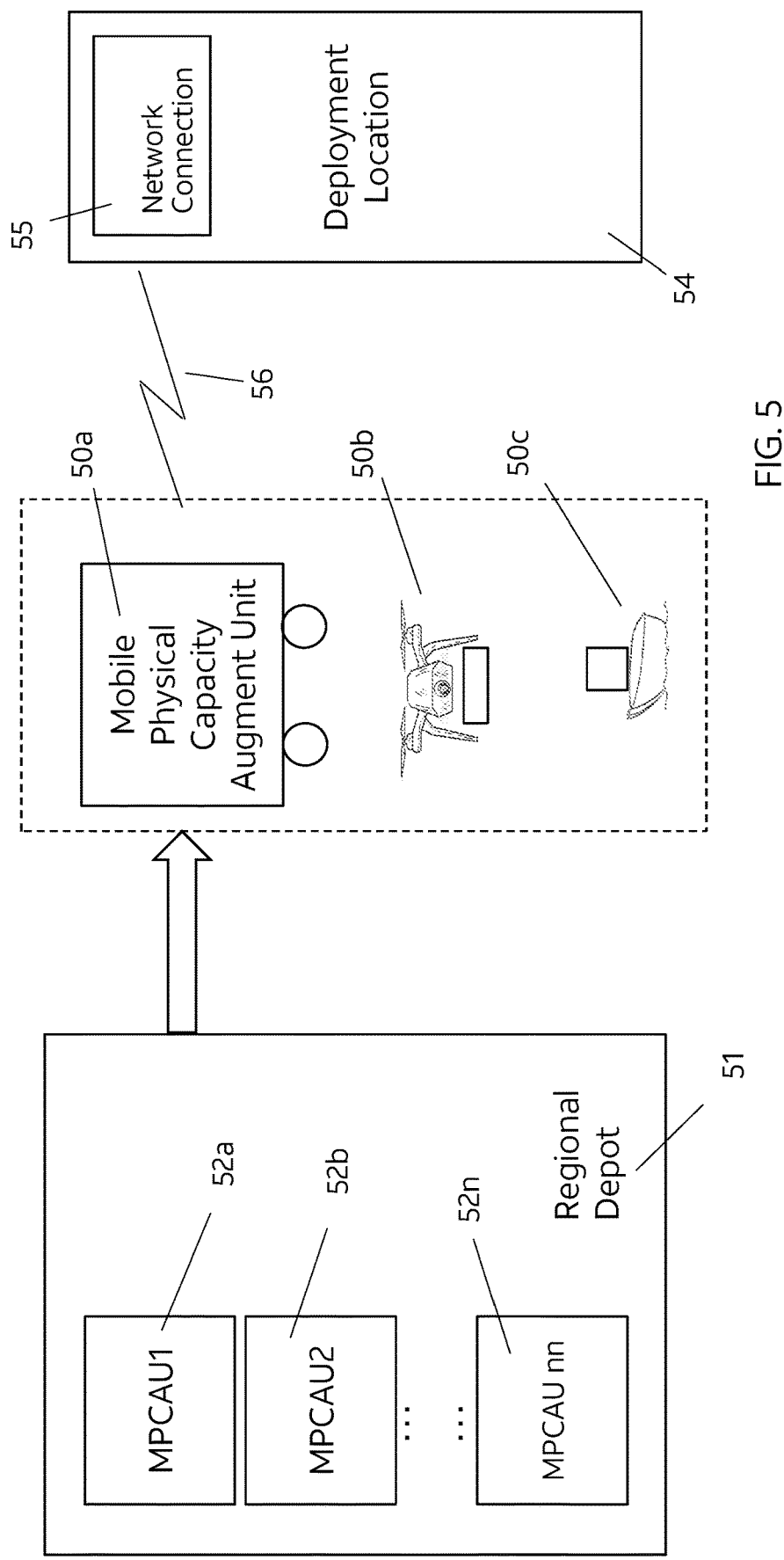
FIG. 5 illustrates an exemplary functional block diagram of the mobile physical capacity augment unit of FIG. 4 connecting to a network.

With reference to FIG. 5, there is shown an exemplary functional diagram of the physical augment. There may be multiple MPCAUs located at a regional depot 51. For example, there may be MPCAU1 52*a*, MPCAU2 52*b* and up to and including MPCAUn 52*n*. As set forth above, each MPCAU may be sized, sorted by type and pre-built in advance of the physical augment and stored at the regional depot 51. Upon command from the autonomous capacity dispatcher 19 or a manual command from a capacity planner, the selected MPCAU 50*a* may be powered up and commanded to leave the regional depot 51 to the deployment location 54. The MPCAU 50*a* may self-navigate to the deployment location 54. Once at the deployment location 54, the MPCAU may park itself in an area designated for physical augments or, if no such area is designated, in an area adjacent to the network and power connection point 55 at the deployment location 54. The MPCAU 50*a* may then connect wirelessly through air interface 56 to the network connection point 55.

The deployment location 54 may be in a secure location such as a secure structure which may, for example, be similar to a large shelter in a parking lot. The regional depot 51 and deployment locations 54 may be configured in a hub and spoke pattern in order to provide an efficient distribution network.

While a secure wireless air interface 56 is shown, it will be understood that a secure wired interface may also be established. For example, the MPCAU 50 may have a hardware port connection to the network connection point 55 that is engaged by the mobile movement of the MPCAU 50*a*.

Figure 6:
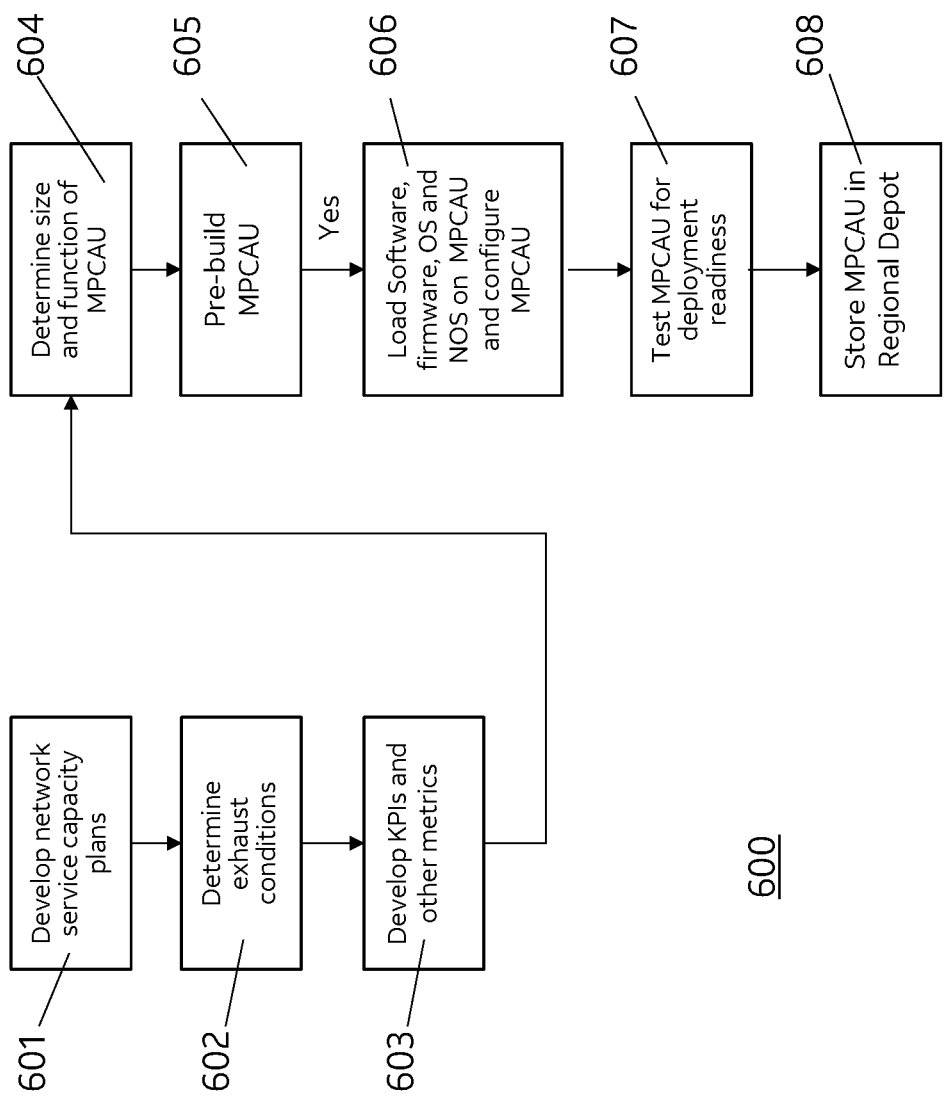
FIG. 6 illustrates an exemplary process flow of a method in accordance with the present disclosure.

While a ground based MPCAU is shown, it will be understood that the MPCAU may also take the form of an unmanned aerial vehicle 50*b* that navigates the physical augment to the deployment location 54. Moreover, the MPCAU may also take the form of a nautical vehicle 50*c* that navigates the physical augment to a water-based deployment location Methods of Use. With reference to FIG. 6, there is shown an exemplary method 600 which may be used by a capacity planner in advance of a requested physical augment. At 601, a network capacity planner may develop current and future network capacity plans. At 602, the exhaust conditions for the network may be determined. At 603 key performance indicators, KPI thresholds, and other network capacity metrics may be defined and established. At 604, the size and functionality of one or more MPCAUs 20 may be determined. At 605, the MPCAU 20 is pre-built based on the size, type and functionality anticipated. At 606, the MPCAU 20 is loaded with the desired firmware/software/OS/NOS and those components are configured in accordance with MPCAU functionality. The MCAU is tested for deployment readiness at 607. At 608, the MPCAU 20 is stored in a regional depot 51 until needed.

Figure 7:
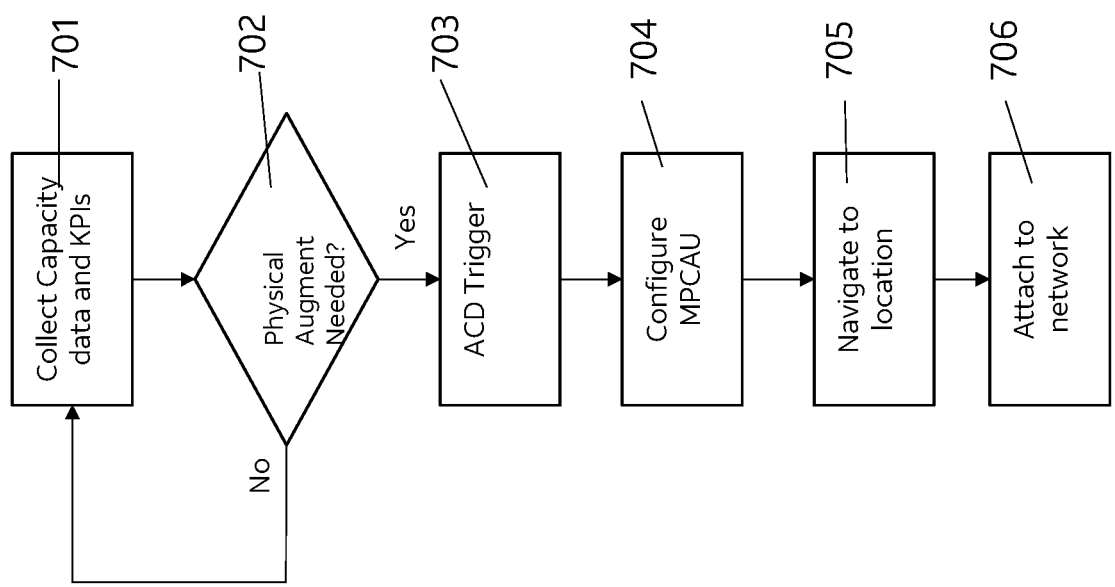
FIG. 7 illustrates another exemplary process flow of a method in accordance with the present disclosure.

With reference to FIG. 7, there is shown an exemplary method 700 which may be used by the system of the present disclosure. At 701, the capacity data and/or KPI measurements may be collected from the network 11. In an aspect, capacity usage trend information may be used along with capacity forecast information to ascertain size and type of physical augment needed. The timing of an augment may, for example, be a function of service platform engineering rules and current capacity utilization. At 702, it is determined whether a physical augment is needed. If not, the autonomous capacity manager 18 continues to collect and analyze capacity data and/or KPI measurements from the network 11. When it is determined that a physical augment is needed, the physical augment is triggered through the autonomous capacity dispatcher 19 at 703. At 704, any final configuration, such as any deployment location specific load, configuration, turn up and testing of the MPCAU 20 is performed. At 705, the MPCAU 20 navigates from the regional depot 51 to the deployment location 54. At 706. The MPCAU 20 attaches wirelessly or via wireline to the network 11 at network connection point 55. At that point, the physical augment may begin servicing customers.

The MPCAU 20 may also status the autonomous capacity dispatcher 19 that the physical augment has been completed. The autonomous capacity dispatcher 19 may work in tandem with the autonomous capacity manager 18 to analyze the post-augment KPI statistics and verify completion of the physical augment.

The autonomous physical capacity augments may be used for permanent capacity augments. Additionally, such physical capacity augments may be scheduled by network planners. Thus, instead of automatic triggers based on KPI thresholds being exceeded, the autonomous physical augments may be triggered based on a scheduled deployment, or a network forecast for an upcoming event.

Moreover, autonomous physical capacity augments may be used for surge capacity. For example, for a large event such as a concert or the Super Bowl, a capacity planner may schedule a physical augment in advance of the event regardless of any particular KPI thresholds. As such, the scheduled physical augment may proceed autonomously based on the schedule as described above. At the conclusion of the event, the physical augment may be reversed whereby the MPCAU 20 disconnects from the network and self-navigates from the deployment location 54 back to the regional depot 51 in order for the mobile infrastructure to be reused when and where needed and to prevent the MPCAU 20 from being stranded at a previous location where it had been used for surge capacity.

In view of the foregoing, this disclosure provides a practical application that builds a centralized system to provide for the automatic augment of physical infrastructure. The practical application includes the autonomous determination for network augment, including the monitoring of KPIs associated with networks, triggering a physical augment, and then autonomously providing that physical augment to the network. As such, the disclosure provides a new and novel method for offering and pricing of a new service offering that advances the state of the telecommunications industry. This includes the timely, efficient and autonomous infrastructure physical capacity deployment the reduces unit cost and enables more competitive service price points.

While the disclosure has been described in relation to a generic network, it will be understood that the systems and methods disclosed herein may be deployed in both cellular networks and information technology infrastructure and support current and future use cases. Moreover, the architecture may also be used by carrier or third-party vendors to augment networks on the edge.

As described herein, a telecommunications system wherein management and control utilizing an autonomous approach to capacity management and a software capacity management application. may provide capacity, monitoring, management, and augment capabilities. that enables wireless management and control, such as mobility management, radio resource management, QoS, load balancing, etc., across many wireless and wireline technologies, e.g. LTE, Wi-Fi, and future 5G access technologies; automating capacity augments fully to reduce network cost and allow massive scale; shortening cycle time and improving network upgradability; flexibility in creating end-to-end services based on types of user equipment and applications, thus improve customer experience; or improving quality of service through efficient management of underlying infrastructure.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, solid state drives, jump drives, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   defining a first key performance indicator for a network;
   monitoring the network based on the first key performance indicator;
   determining whether a physical capacity augment of the network is recommended based on the monitoring;
   configuring a mobile physical capacity augment unit based on the determining, the mobile physical capacity augment unit having self-sufficient resources for power, cooling, and wireless connectivity; and
   deploying the mobile physical capacity augment unit to implement the physical capacity augment, the deploying comprising navigation of the mobile physical capacity augment unit, including the self-sufficient resources for power, cooling, and wireless connectivity, to a physical location, and the deploying further comprising enabling at the physical location a wireless connection to the network via the wireless connectivity of the mobile physical capacity augment unit.

2. The method of claim 1 wherein the enabling the wireless connection is performed autonomously at the physical location.

3. The method of claim 1, wherein the mobile physical capacity augment unit navigates to the physical location autonomously.

4. The method of claim 1, wherein the first key performance indicator includes a network capacity measurement, and wherein the determining comprises determining whether loading on the network has surpassed a first threshold.

5. The method of claim 4, wherein the determining whether the loading on the network has surpassed the first threshold comprises determining whether the loading on the network has surpassed the first threshold for a time period.

6. The method of claim 1, wherein the monitoring further comprises monitoring the network based on a second key performance indicator, wherein the first key performance indicator indicates loading on the network has reached a pre-exhaust level and the second key performance indicator indicates loading on the network has reached an exhaust level, and wherein the deploying is based on the second key performance indicator.

7. The method of claim 1, wherein the configuring step comprises sizing the mobile physical capacity augment unit to be deployed.

8. The method of claim 7, wherein the configuring further comprises loading software applications on the mobile physical capacity augment unit.

9. The method of claim 8, wherein the mobile physical capacity augment unit is prebuilt, and the configuring further comprises configuring the mobile physical capacity augment unit to enable attachment to the network.

10. The method of claim 1, wherein the mobile physical capacity augment unit is a terrestrial unit.

11. The method of claim 1, wherein the mobile physical capacity augment unit is one of a nautical unit or an aerial unit.

12. The method of claim 1, wherein the mobile physical capacity augment unit is prebuilt.

13. A system comprising:
   a capacity manager in communication with a network, wherein the capacity manager is configured to analyze performance of the network in view of key performance indicators of the network; and
   a capacity dispatcher in communication with the capacity manager, wherein the capacity dispatcher is configured to provide network parameters to a mobile physical capacity augment unit;
   wherein the mobile physical capacity augment unit comprises:
      self-sufficient resources for power, cooling, and wireless connectivity;
      an input-output interface;
      a processor coupled to the input-output interface, wherein the processor is further coupled to a memory, the memory having stored thereon executable instructions that when executed by the processor cause the processor to effectuate operations comprising:
         receiving network parameters relating to a physical augment;
         autonomously configuring the physical augment based on the network parameters;
         self-navigating to a site at which the physical augment can attach to the network via the wireless connectivity of the mobile physical capacity augment unit; and attaching the physical augment to the network via the wireless connectivity of the mobile physical capacity augment unit.

14. The system of claim 13, wherein the self-navigating comprises terrestrial navigation to the site.

15. The system of claim 13, wherein the self-navigating comprises one of nautical navigation to the site or aerial navigation to the site.

16. The system of claim 13, wherein the mobile physical capacity augment unit includes a software defined network, and wherein the configuring comprises receiving software to configure the physical augment.

17. The system of claim 13, wherein the mobile physical capacity augment unit is prebuilt and wherein the autonomously configuring further comprises sizing, software components of the mobile physical capacity augment unit.

18. A system comprising:
 a capacity manager in communication with a network, wherein the capacity manager is configured to analyze performance of the network in view of key performance indicators of the network;
 a capacity dispatcher in communication with the capacity manager, wherein the capacity dispatcher is configured to provide network parameters to a mobile physical capacity augment unit upon receiving a command from the capacity manager, the mobile physical capacity augment unit having self-sufficient resources for power, cooling, and wireless connectivity; and
 the mobile physical capacity augment unit, wherein the mobile physical capacity augment unit is prebuilt and has an autonomous navigation system, wherein the mobile physical capacity augment unit is configured in accordance with the network parameters by a software download, wherein the mobile physical capacity augment unit autonomously traverses to a network attachment site, and wherein at the network attachment site the mobile physical capacity augment unit enables a connection to the network via the wireless connectivity of the mobile physical capacity augment unit.

19. The system of claim 18, wherein the mobile physical capacity augment unit is one of a terrestrial unit, a nautical unit or an aerial unit.

20. The system of claim 18, wherein the key performance indicators include a network capacity measurement.

* * * * *